March 23, 1965     I. FEUER     3,175,116
ELECTROLUMINESCENT CONDENSER

Filed May 2, 1962

INVENTOR
IRVING FEUER
BY
Blum, Moscovitz, Friedman
& Blum.

ATTORNEYS.

3,175,116
ELECTROLUMINESCENT CONDENSER
Irving Feuer, New York, N.Y., assignor to Canrad Precision Industries, Inc., New York, N.Y., a corporation of New York
Filed May 2, 1962, Ser. No. 191,919
12 Claims. (Cl. 313—108)

This invention relates to electroluminescent condensers or lamps and provides an improved condenser.

The life and usefulness of electroluminescent lamps is commonly dependent upon the appearance of darkened or blackened areas at or beneath the transparent electrode. The blackening is believed to be the result of abnormal reactions which, in turn, may be caused by any one of a number of malfunctions. It is likely that principal malfunctions are due to excessive voltage, or short circuiting as may result from a direct path through phosphor particles from one electrode to the other or from the presence of moisture, or to discharges occurring between an electrode and phosphor particle as might result from faulty distribution of the dielectric about the phosphor particles, or to abnormal discharges of any origin. Decomposition reactions in which the dielectric is decomposed very likely account for most of the blackening.

A principal object of the invention is to provide a condenser structure having the advantage that substantially less blackening occurs during use of the condenser.

Another object of the invention is to provide a condenser structure in which direct contact of phosphor particles and an electrode, or electroconductive material associated with the electrode, is effectively prevented.

Another object of the invention is to provide protection against or prevent the adverse effects of moisture on operation of the condenser.

According to the invention, these and other objects as will be apparent from the ensuing description, are attained by providing a film of a fluoride of a Group II metal interposed between the layer of phosphor and dielectric and at least one of the electrodes. With respect to water or moisture as may be present or gain access to the condenser, the material of the film of the invention should be of low solubility, and to the extent that it does dissolve in water, it should provide alkaline condition.

The materials of the group magnesium fluoride, calcium fluoride, and barium fluoride can be used as the film material. The preferred material is magnesium fluoride.

The film can be applied to the electrode by the known procedures for applying films of metal salts to optical glass and involving the use of vacuum and heat.

The film can be applied to both electrodes of the condenser, or to either one. The advantages realized by coating metal electrodes are more pronounced, probably by reason of the greater conductivity of the metal electrode.

The invention is further described in the accompanying drawing, in which.

In the various figures, like reference characters indicate corresponding parts, and same parts, such as films, are shown disproportionately large to better illustrate the invention.

Figure 1:
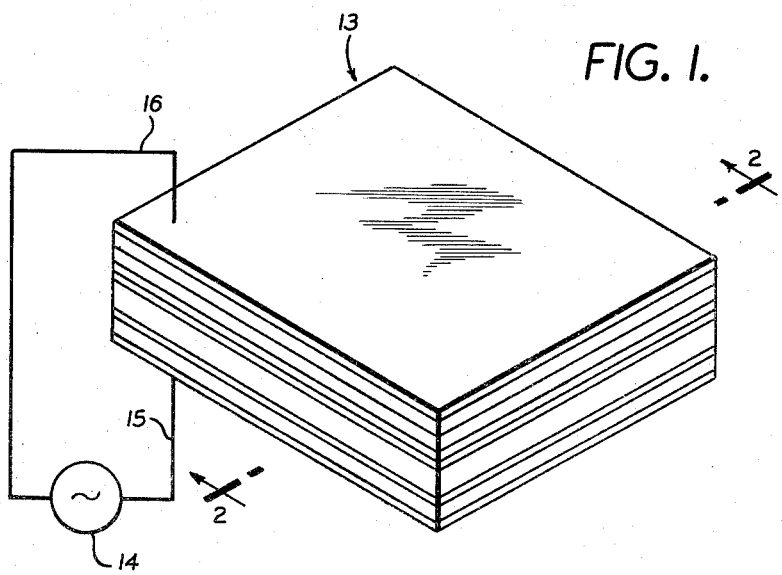
FIG. 1 is a perspective view of a condenser according to the invention showing the electrical supply circuit schematically.
Figure 2:
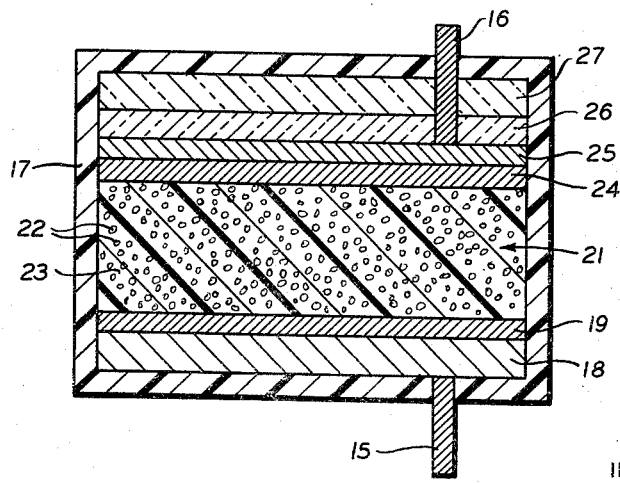
FIG. 2 is a cross-section of the condenser shown in FIG. 1, taken on line 2—2 in FIG. 1.

Referring to the drawing, an electroluminescent cell 13 is connected to a source of alternating current 14 by leads 15, 16. The cell includes outer casing 17 of glass or plastic, metal electrode 18, magnesium fluoride film 19 according to the invention, a layer of phosphor and dielectric 21 made up of phosphor particles 22 in a matrix of dielectric 23, magnesium fluoride film 24, an electroconductive glass electrode made up of tin oxide or tin chloride film 25, and transparent glass panel 26, and plate glass cover 27. The leads 15 and 16 are connected, respectively, to the electrode 18 and the tin oxide film 25 in a manner known in the art.

The electrode 18 can be aluminum, iron, copper or other suitable metal, or it can be an electroconductive glass. The magnesium fluoride film 19 can be 0.04–.7 micron in thickness and is preferably 0.1–0.3 micron. This film should not be so thick that it interferes with the energy transfer from the electrode. The glass electrode can be as described or of other form known in the art. The film of magnesium chloride on the glass electrode can be 0.04–0.7 micron, and should not be so thick as to interfere with energy transfer or the transmission of light.

In one embodiment of the invention, the coating according to the invention is applied to the metal electrode only. This is a desirable construction as darkening is very substantially reduced by this step alone.

The invention is further described in the following specific example.

Example 1

An aluminum electrode is coated with a magnesium fluoride ($MgF_2$) film 0.2–0.5 micron thick in a manner known in the art and utilizing vacuum and heat. The procedure of Lyon Patent 2,398,382 for coating glass can be employed for applying the magnesium fluoride film. A 0.1–3.0 mil layer of phosphor and dielectric is applied over the coated metal electrode in known manner. The phosphor is the ZnS type, ranges in size from 0.2 to 2 microns, and is 75–90% by weight of the layer of phosphor and dielectric. The dielectric is Cyanocell brand cyanoethylated cellulose containing dimethyl phthalate as a plasticizer.

An electroconductive glass of the tin oxide or tin chloride type coated with magnesium fluoride by the procedure and to the thickness utilized for the metal electrode, is then placed on the layer of phosphor and dielectric with the magnesium fluoride film contacting the said layer.

The condenser is finished by covering and connecting electrodes as is indicated in the drawing.

This cell yields visible light at 9 volts, 60 cycles and higher energy supply levels. In tests at 110 volts, 60 cycles and 150 volts, 60 cycles on cells with and without the magnesium fluoride film, the number of blackening discharges was less for the cells having the magnesium fluoride film.

In this example, barium fluoride ($BaF_2$) or calcium fluoride ($CaF_2$) can be used in place of the magnesium fluoride ($MgF_2$).

An advantage to the film according to the invention is that any interaction between the film and water will provide alkaline conditions rather than acidity which would be reactive with phosphor such as ZnS. The materials used according to the invention, to the extent that they dissolve in water, provide a weak acid and a weak base, the base being more highly ionized than the acid, however, so that basic conditions result.

Still another advantage of a film according to the invention is that it prevents abrasion of the electrodes.

While the invention has been described with reference to particular embodiments thereof, it is intended to secure by these Letters Patent all such alterations and modifications as will be apparent to those skilled in the art from the foregoing description and as are within the purview of the appended claims.

What is claimed is:

1. In an electroluminescent condenser comprising an electrode, a layer of phosphor and dielectric material over said electrode and a transparent electrode over the layer of phosphor and dielectric, the improvement which comprises a film of a fluoride of a Group II metal interposed between said layer and at least one of said electrodes.

2. An electroluminescent condenser according to claim 1, said Group II metal being magnesium.

3. An electroluminescent condenser according to claim 1, said Group II metal being calcium.

4. An electroluminescent condenser according to claim 1, said Group II metal being barium.

5. In an electroluminescent condenser comprising a metal electrode, a layer of phosphor and dielectric material over said electrode and a transparent electrode over the layer of phosphor and dielectric, the improvement which comprises a film of a fluoride of a Group II metal interposed between said layer and at least one of said electrodes.

6. An electroluminescent condenser according to claim 5, said Group II metal being magnesium.

7. An electroluminescent condenser according to claim 5, said Group II metal being calcium.

8. An electroluminescent condenser according to claim 5, said Group II metal being barium.

9. The electroluminescent condenser of claim 5, wherein said film of a fluoride of a Group II metal is 0.04 to 0.7 micron in thickness.

10. In an electroluminescent condenser comprising an electrode, a layer of phosphor and dielectric material over said electrode and a transparent electrode over the layer of phosphor and dielectric, the improvement which comprises a first film of a fluoride of a Group II metal between said first electrode and said layer of phosphor and dielectric material, and a second film of a fluoride of a Group II metal interposed between said transparent electrode and said layer of phosphor and dielectric material.

11. The electroluminescent condenser of claim 10 wherein each of said films of said fluoride of a Group II metal has a thickness in the range of 0.04 to 0.7 micron.

12. The electroluminescent condenser of claim 10 wherein said fluoride is magnesium fluoride.

References Cited in the file of this patent
UNITED STATES PATENTS

| | | |
|---|---|---|
| 2,798,823 | Harper | July 9, 1957 |
| 2,834,903 | Roberts | May 13, 1958 |
| 2,929,950 | Hanlet | Mar. 22, 1960 |
| 3,043,710 | Patten et al. | July 10, 1962 |

FOREIGN PATENTS

| | | |
|---|---|---|
| 157,101 | Australia | Feb. 19, 1953 |